United States Patent [19]

Koster

[11] Patent Number: 4,541,651
[45] Date of Patent: Sep. 17, 1985

[54] AUTOMATIC FIFTH WHEEL LUBRICATION SYSTEM

[76] Inventor: Raymond E. Koster, R.R. #1, Dorchester, Iowa 52140

[21] Appl. No.: 630,429

[22] Filed: Jul. 12, 1984

[51] Int. Cl.$^4$ .............................................. B62D 53/08
[52] U.S. Cl. ...................................... 280/433; 184/80; 184/82
[58] Field of Search .................... 280/433, 434, 438 R, 280/438 A, 421, 432; 184/65, 80, 82, 87, 69, 75, 14

[56] References Cited

U.S. PATENT DOCUMENTS

| 1,235,812 | 8/1917 | Kelly | 184/69 |
| 3,463,512 | 8/1969 | Hodgson | 280/433 |
| 3,743,054 | 7/1973 | Jones | 280/433 |

FOREIGN PATENT DOCUMENTS 36773  3/1983  Japan ..................... 280/433

Primary Examiner—Joseph F. Peters, Jr.
Assistant Examiner—Everett G. Diederiks, Jr.
Attorney, Agent, or Firm—Harvey B. Jacobson

[57] ABSTRACT

A reservoir for grease is provided above the downwardly facing fifth wheel pin plate of a semi-trailer and opens downwardly through the plate at a point spaced forwardly of the associated depending fifth wheel pin. The reservoir may be filled with lubricating grease through a grease fitting associated therewith and sealed whereby the introduction of grease thereinto under pressure will cause the air pressure within the reservoir to be increased. The lower end of the reservoir opens downwardly through the fifth wheel plate and is equipped with a spring-biased ball valve projectable downwardly into sealed engagement with an appropriate seal provided therefor about the outlet of the reservoir and with the ball valve projecting below the fifth wheel pin plate. When the semi-trailer is operatively coupled to a tractor with the fifth wheel pin plate disposed in superposed contacting relation with the fifth wheel on the tractor, the ball valve is upwardly displaced from the seal and lubricating grease under pressure is allowed to flow from the reservoir into the interface area disposed between the fifth wheel pin plate and the fifth wheel. In addition, if the use of lighter lubricants is desired, the reservoir may have a supply reservoir disposed at a higher elevation than the fifth wheel pin plate sealingly communicated therewith in order that lubricant from the supply reservoir may flow by gravity downward into and through the ball valve equipped reservoir for lubricating the interface area between the fifth wheel pin plate and the fifth wheel plate.

7 Claims, 5 Drawing Figures

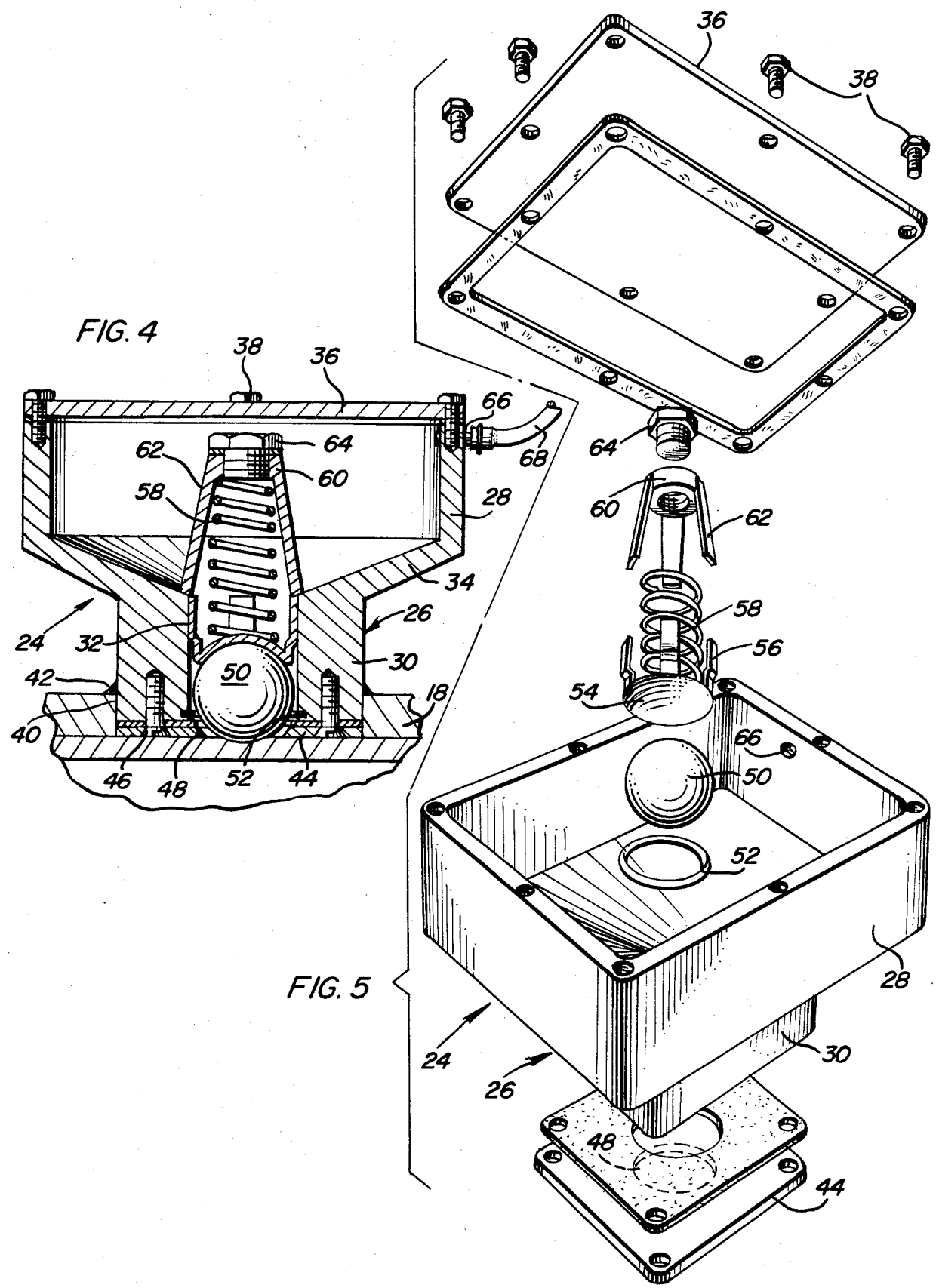

AUTOMATIC FIFTH WHEEL LUBRICATION SYSTEM

BACKGROUND OF THE INVENTION

The interface area between the undersurface of a semi-trailer fifth wheel pin plate and the upper surface of a tractor fifth wheel plate must be maintained properly lubricated.

The usual practice of lubricating this interface area involves disconnecting the tractor from the semi-trailer, the application of a quantity of grease to the upper surface of the tractor trailer fifth wheel plate and the reconnection of the semi-trailer to the tractor. This operation is of course time-consuming inasmuch as not only must the tractor be uncoupled from the trailer and moved outward from therebeneath and subsequently moved back beneath and coupled to the trailer, but the landing gear of the trailer must be lowered and raised. These time-consuming operations, when added to other normal maintenance operations, are sometimes considered as excessive and skipped with the result that fifth wheel pin plates and fifth wheel plates are not properly lubricated.

In addition, if a tractor is driven over more than a short over-the-road distance to pickup a semi-trailer during inclement weather the grease upon the fifth wheel plate of the tractor can become excessively contaminated with dirt and/or sand with the result that such grease should be removed prior to coupling of the tractor to a semi-trailer. While removal of contaminated grease may be reasonably quickly carried out, the additional time which then must be spent to properly coat the fifth wheel plate with grease can be considered as excessive if a short operational time consideration is present with respect to a deadline for delivery of the semi-trailer to be trailed behind the tractor. Accordingly, in the interest of saving time contaminated grease is sometimes not removed from a tractor fifth wheel plate and replaced by new grease.

Accordingly, it may be seen that a need exists for a means whereby the grease on a tractor fifth wheel plate may be replenished either automatically or with a minimum of effort.

Various forms of fifth wheel lubricating structures and other lubricating devices including some of the general structural and operational features of the instant invention are disclosed in U.S. Pat. Nos. 141,168, 1,235,812, 3,463,512, 3,598,427, 3,622,173 and 3,743,054. However, these previously known forms of lubricating devices do not incorporate the combined structure of the instant invention in operative association with a fifth wheel plate or a fifth wheel pin plate in a manner such that controlled lubrication of such plates may be effected.

BRIEF DESCRIPTION OF THE INVENTION

The lubrication system of the instant invention is carried by the fifth wheel pin plate of a semi-trailer and is operative to dispense lubricant to the interface area between the trailer fifth wheel pin plate and an associated tractor fifth wheel plate upon the coupling of the trailer to an associated tractor. In addition, the lubrication system includes structure whereby the discharging of lubrication material thereby is terminated as a result of the semi-trailer being disconnected from a tractor.

The main object of this invention is to provide a lubrication system for the fifth wheel plate components of a tractor and semi-trailer.

Another object of this invention is to provide a lubrication system which may function either manually or automatically.

Yet another object of this invention is to provide a lubrication system which may be readily incorporated in the manufacture of new semi-trailer fifth wheel pin plates as well as retrofitted to existing semi-trailer fifth wheel pin plates.

A final object of this invention to be specifically enumerated herein is to provide a fifth wheel lubricating system in accordance with the preceding objects and which will conform to conventional forms of manufacture, be of simple construction and dependable in operation so as to provide a device that will be economically feasible, long lasting and relatively trouble free.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is an enlarged fragmentary longitudinal vertical sectional view of the lubrication system and the adjacent portions of the semi-trailer fifth wheel pin plate and the tractor fifth wheel plate; and FIG. 5 is an exploded perspective view of the lubrication system.

DETAILED DESCRIPTION OF THE INVENTION

Figure 1:
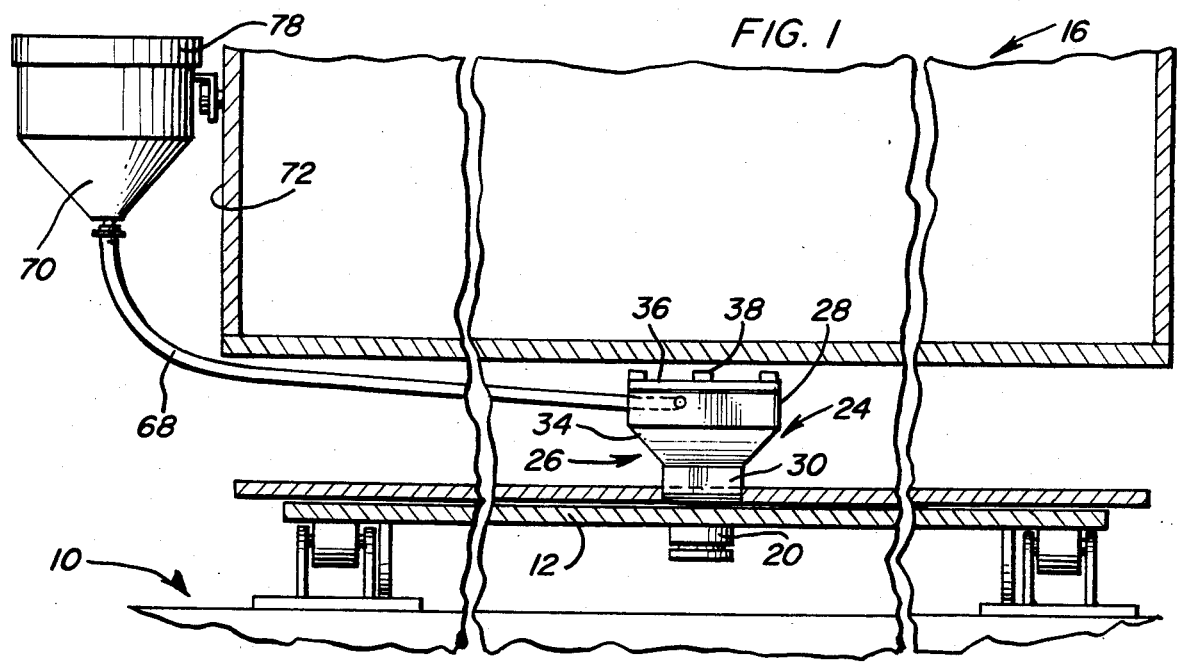
FIG. 1 is a fragmentary transverse vertical sectional view of a semi-trailer and tractor fifth wheel assembly and with the lubrication system of the instant invention operatively associated therewith.
Figure 2:
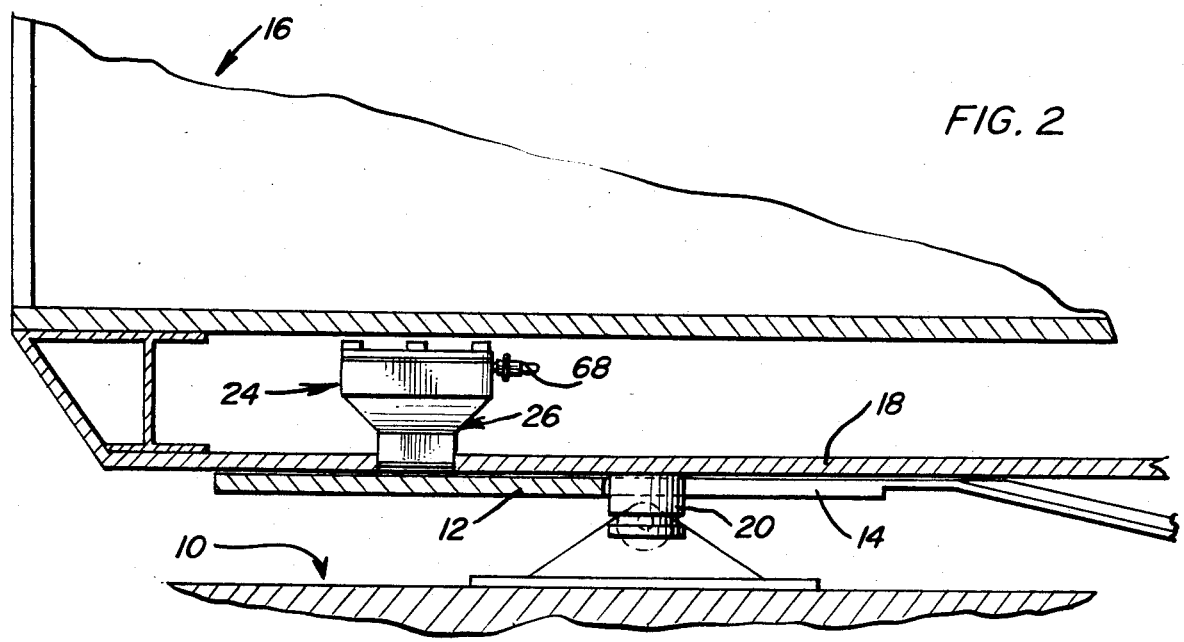
FIG. 2 is a fragmentary longitudinal vertical sectional view of the assemblage illustrated in FIG. 1.
Figure 3:
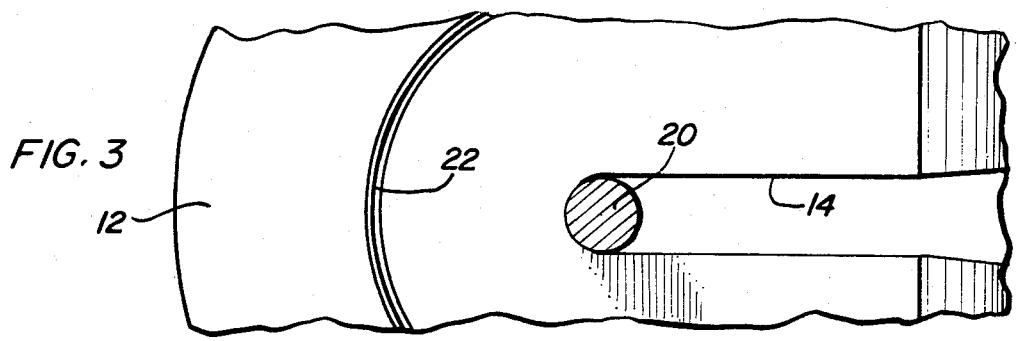
FIG. 3 is a fragmentary horizontal sectional view of the assemblage illustrated in FIG. 2 and taken substantially upon a plane immediately above the tractor fifth wheel plate.

Referring now more specifically to the drawings the numeral 10 generally designates a tractor vehicle including the usual oscillatably supported fifth wheel plate 12 provided with a rearwardly opening entrance slot 14 and the numeral 16 generally designates a conventional form of semi-trailer equipped with a fifth wheel pin plate 18 including a depending fifth wheel pin 20 forwardly receivable and seatable within the slot 14 when the plates 18 and 20 are moved into superposed relation with the plate 18 bearing downward upon the plate 12. Latch and lock structure (not shown) is conventionally provided for maintaining the pin 20 seated within the forward end of the slot 14 in a manner enabling relative rotation between the pin 20 and the plate 12.

The plate 12 may be provided with an upwardly opening arcuate groove 22 in which to trap lubricating fluid such as grease disposed between the plates 12 and 18 to facilitate in spreading the lubricating fluid or grease over the undersurface of the fifth wheel pin plate, the groove 22 being disposed concentric with the center axis of the pin 20 when the latter is seated in the forward end of the slot 14.

The lubrication system of the instant invention is referred to in general by the reference numeral 24 and includes a lubricating grease reservoir 26 including a large cross-sectional area hollow upper end portion 28, a diametrically reduced lower end portion 30 defining a vertical bore 32 formed therethrough and a hollow frusto-conical intermediate portion 34 upwardly into which the upper end of the bore 32 opens, the upper end of the intermediate portion 34 opening into the lower end of the upper end portion 28. The open upper end of the upper end portion 28 is removably sealingly closed by a cover plate 36 secured to the upper end portion 28 by suitable threaded fasteners 38 and the lower end of the lower end portion 30 is secured within an upstanding opening 40 formed in the fifth wheel plate 18. The lower end portion 30 may be secured within the opening 40 in any convenient manner such as by welding 42.

The lower end portion 30 is recessed slightly upwardly within the lower end of the bore 40 and is partially closed by a gasket equipped lower end plate 44 removably secured thereover by threaded fasteners 46 and the end plate 44 includes a bevelled central opening 48 formed therein against which the underside of a ball member 50 loosely reciprocal in the bore 32 is seatable. Also, the lower end of the bore 32 includes an annular seal 52 against which the maximum diameter portion of the ball 50 is sealingly seated when the ball 50 is downwardly seated in the opening 48.

The upper end of the bore 32 includes a follower 54 guidingly slidable therein and equipped with peripherally spaced upwardly projecting retaining fingers 56 and the lower end of a compression spring 58 bears downward upon the center portion of the follower 40 between the fingers 56. The upper end of the compression spring 58 bears against the upper end wall 60 of a spider-type abutment 62 mounted within and projecting upwardly from the lower extremity of the intermediate portion 34, the upper end wall 60 including a removable threaded plug 64.

The lubricant reservoir 26 includes an inlet fitting 66 opening thereinto to which one end of a delivery hose 68 is sealingly connected and the other end of the delivery hose 68 opens downwardly from the lower end of a supply reservoir 70 mounted on the forward wall 72 of the semi-trailer 16 in elevated position relative to the reservoir 26. Accordingly, the reservoir 26 receives lubricant from the supply reservoir 70 under pressure and the supply reservoir 70 includes a removable top 78 by which the supply of lubricant within the reservoir 70 may be replenished.

If it is desired, the inlet fitting 66 may be provided with a check valve and the upper end portion 28 of the reservoir 26 may be provided with a zerk-type grease fitting (not shown). In this manner, lubricant (grease) may be admitted to the interior of the reservoir 26 under pressure without subjecting the interior of the supply reservoir 70 to the same pressure.

In operation, the reservoirs 26 and 70 may be filled with suitable lubricant and the lubricant will tend to flow by gravity from the reservoir 70 into the reservoir 26 and outwardly therefrom through the lower end of the bore 32 about the ball 50.

However, when the semi-trailer 16 is disconnected from the tractor 10 the ball 50 is free to move downwardly in the bore 32 under the biasing action of the spring 58 until the ball 50 is seated against the bevelled opening 48 and the annular seal 52. Sealing engagement of the annular seal 52 with the ball 50 will of course terminate the flow of lubricant from the reservoir 26 outwardly through the opening 48. However, the next time a tractor fifth wheel is backed under the fifth wheel plate 18 and coupled to the pin 20, the ball 50 will be upwardly displaced from its lower limit position out of sealed engagement with the annular seal 52 and fifth wheel lubricating fluids may flow downwardly from the reservoir 26 outwardly through the opening 48 and into the interface area between the plates 12 and 18, the groove 22 being registered with the lower end of the bore 32 for seatingly receiving the ball 50 therein and comprising means by which lubricant fluid discharged from the reservoir 26 may be more readily distributed over the interface area between the plates 12 and 18.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a first vehicle component including a first downwardly facing bearing plate from which a hitch pin depends and a second vehicle component including a second upwardly facing bearing plate having a slot formed therein including an outer open end and a closed inner end, said pin being slidably receivable within said slot and rotatably seatable in the inner end thereof upon relative horizontal shifting of said plates into contacting load bearing superposed positions, a fifth wheel lubrication system including reservoir means supported from a first side of one of said plates and including an outlet opening through said one plate, said reservoir means being adapted to contain liquid lubricant under pressure at said outlet, said outlet including a spring-biased ball valve mounted therein and shiftable between a projected position projecting a predetermined distance outward of the second side of said one plate opposing said other plate and a retracted position disposed inward of said projected position, said outlet including seal means against which said ball valve is seatable in said projected position to close said outlet and inwardly of which said ball valve is disposed when in said retracted position, whereby liquid lubricant under pressure at said outlet may pass outward therefrom when said ball valve is in said retracted position.

2. The fifth wheel lubrication system of claim 1 wherein said reservoir means, other than said outlet, is closed and may thereby contain liquid lubricant pressurized by air under pressure disposed within said reservoir over the level of said liquid lubricant.

3. The fifth wheel lubrication system of claim 1 wherein said first and second plates include front and rear marginal portions, said reservoir means and outlet being disposed forward of said pin.

4. The lubrication system of claim 1 wherein said one plate comprises said downwardly facing bearing plate.

5. The lubrication system of claim 4 wherein said reservoir means includes a liquid lubricant inlet spaced above said outlet, a supply reservoir supported from said first vehicle component at an elevation spaced above said reservoir means, and conduit means communicating a lower portion of the interior of said supply reservoir with said liquid lubricant inlet of said reservoir means.

6. The lubrication system of claim 5 wherein said reservoir means, other than said outlet, is closed and may thereby contain liquid lubricant pressurized by air under pressure disposed within said reservoir over the level of said liquid lubricant.

7. The lubrication system of claim 1 wherein the side of said other plate opposing said one plate includes an arcuate groove formed therein concentric with said pin and in which said ball is seated.

* * * * *